(12) United States Patent
Wipplinger et al.

(10) Patent No.: US 8,027,786 B2
(45) Date of Patent: Sep. 27, 2011

(54) METHOD AND APPARATUS FOR EDITING ELECTRONIC FLIGHT PLANS (75) Inventors: Patrick Wipplinger, Mörfelden-Walldorf (DE); Thomas Grasse, Dietzenbach (DE)

(73) Assignee: The Boeing Company, Chicago, IL (US)

( * ) Notice: Subject to any disclaimer, the term of this patent is extended or adjusted under 35 U.S.C. 154(b) by 876 days.

(21) Appl. No.: 12/042,179

(22) Filed: Mar. 4, 2008

(65) Prior Publication Data

US 2009/0228202 A1 Sep. 10, 2009

(51) Int. Cl.
*G01C 21/00* (2006.01)

(52) U.S. Cl. ...................................................... 701/206

(58) Field of Classification Search ................... 701/3, 4, 701/7, 13, 14, 25, 66, 206, 208; 340/945, 340/973, 974, 977, 978
See application file for complete search history.

(56) References Cited

U.S. PATENT DOCUMENTS

| | | | |
|---|---|---|---|
| 6,995,690 B1 * | 2/2006 | Chen et al. | 340/974 |
| 7,844,373 B2 * | 11/2010 | Deker | 701/14 |
| 2008/0163093 A1 * | 7/2008 | Lorido | 715/771 |

* cited by examiner

*Primary Examiner* — Kim T Nguyen
(74) *Attorney, Agent, or Firm* — Yee & Associates, P.C.

(57) ABSTRACT

A computer implemented method, apparatus, and computer usable program code for managing a flight plan for an aircraft. A set of projected flight plan parameters are displayed associated with a waypoint presented on a display of an aircraft data processing system. User input is received to form a set of actual flight plan parameters. A set of variances between the set of projected flight plan parameters and the set of actual flight plan parameters is displayed on a map in association with the waypoint.

20 Claims, 5 Drawing Sheets

METHOD AND APPARATUS FOR EDITING ELECTRONIC FLIGHT PLANS

BACKGROUND INFORMATION

1. Field

The present disclosure relates generally to an improved data processing system and in particular to a method and apparatus for editing electronic flight plans.

2. Background

A flight plan is a document typically filed by pilots or flight dispatcher prior to departure for a flight. This document may be both physical and electronic in form. A flight plan typically includes information such as, for example, departure points, en route points, arrival points, projected time en route, projected winds, alternate airports in case of bad weather, type of flight, pilots name, and other suitable information.

The different flight parameters, such as time to reach waypoints and fuel burn, may be recorded as comparison to the projected parameters in the flight plan. These actual parameters are compared with the projected flight plan parameters to identify abnormal flight progress. Abnormal flight progress may be used to identify flight safety issues.

Further, if an aircraft takes longer than expected to reach a particular waypoint resulting in increased fuel burn, changes in flight plan parameters may be needed, depending on the amount of fuel that is predicted to be needed to reach the destination. The changes may be, for example, changes in speed and/or route of the aircraft.

A pilot or other crew member typically records the actual value for the flight plan parameters as different waypoints are reached. These actual values are compared to the projected flight plan parameters. Currently, flight plan parameters for flight plans are written down on paper, either on a paper copy of the flight plan or on any piece of paper available. This type of process is cumbersome and requires a pilot or other crew member to focus on this task. As a result, a pilot or aircraft crew may be unable to perform other tasks unrelated to flying the aircraft during flight, which may require more time after the flight has been completed. This situation may result in longer times between flights with the additional time needed to perform the different duties involved in a flight that has been completed and in preparing for a new flight.

Therefore, it would be advantageous to have a computer implemented method, apparatus, and computer usable program code that overcomes the problems described above.

SUMMARY

The advantageous embodiments provide a computer implemented method, apparatus, and computer usable program code for managing a flight plan for an aircraft. A set of projected flight plan parameters are displayed associated with a waypoint presented on a display of an aircraft data processing system. User input is received to form a set of actual flight plan parameters. A set of variances between the set of projected flight plan parameters and the set of actual flight plan parameters is displayed on a map in association with the waypoint.

In yet another advantageous embodiment, a data processing system comprises a bus, a communications unit connected to the bus, a storage device, and a processor unit. The storage device includes computer usable program code. The processor unit executes the computer usable program code to display a set of projected flight plan parameters associated with a waypoint presented on a display of an aircraft data processing system; receive user input to form a set of actual flight plan parameters; and display a set of variances between the set of projected flight plan parameters and the set of actual flight plan parameters on a map in association with the waypoint.

In still yet another advantageous embodiment, a computer program product contains program code on a computer readable medium. Program code is present for displaying a set of projected flight plan parameters associated with a waypoint presented on a display of an aircraft data processing system. Program code is also present for receiving user input to form a set of actual flight plan parameters. Program code is present for displaying a set of variances between the set of projected flight plan parameters and the set of actual flight plan parameters on a map in association with the waypoint.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
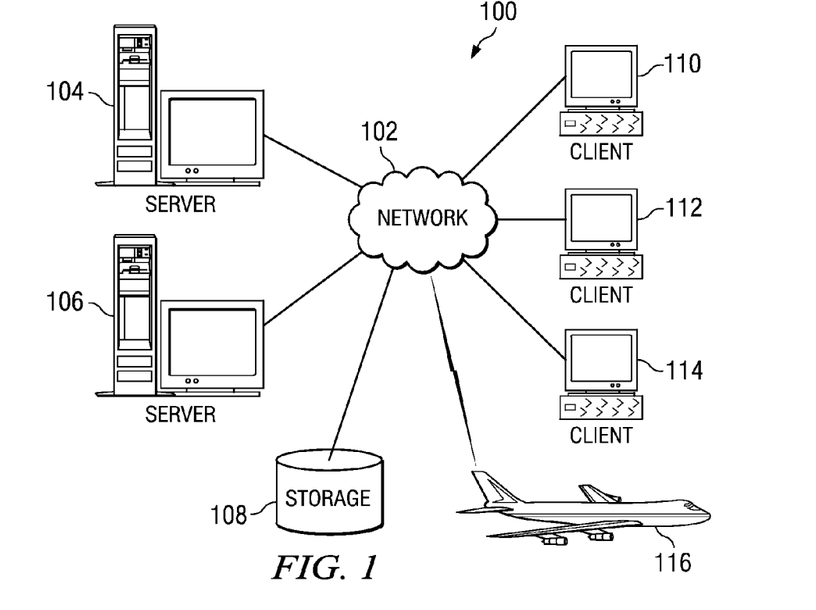
FIG. 1 is a pictorial representation of a network of data processing systems in which the advantageous embodiments may be implemented.
Figure 2:
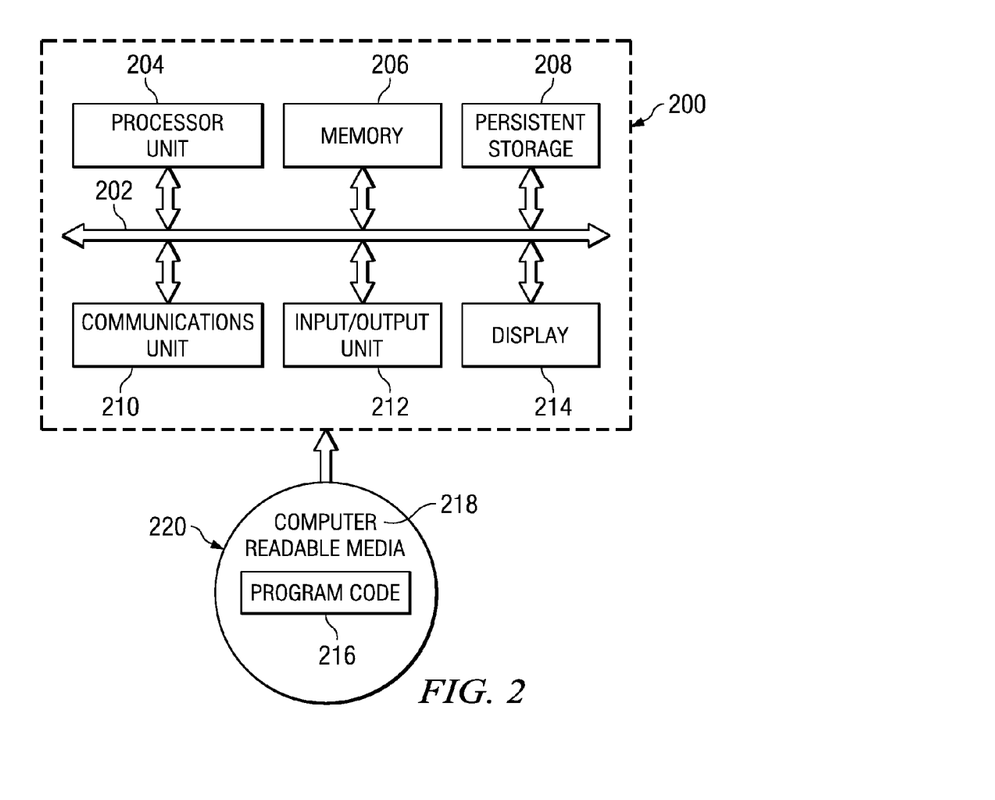
FIG. 2 is a diagram of a data processing system in accordance with an advantageous embodiment.

With reference now to the figures and in particular with reference to FIGS. 1-2, exemplary diagrams of data processing environments are provided in which the advantageous embodiments of the present invention may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which the advantageous embodiments of the present invention may be implemented. Network data processing system 100 is a network of computers in which embodiments may be implemented. Network data processing system 100 contains network 102, which is the medium used to provide communications links between various devices and computers connected together within network data processing system 100.

Network 102 may include connections, such as wire, wireless communication links, or fiber optic cables. In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114.

Clients 110, 112, and 114 are clients to server 104 in this example. Aircraft 116 also is a client that may exchange information with clients 110, 112, and 114. Aircraft 116 also may exchange information with servers 104 and 106. Aircraft 116 may exchange data with different computers through a wireless communications link while in-flight or any other type of communications link while on the ground. In these examples, server 104, server 106, client 110, client 112, and client 114 may be computers.

In the different advantageous embodiments, a data processing system on aircraft 116 may record actual values for projected flight plan parameters to form actual flight plan parameters. These values may be stored with the flight plan for archiving and storage on a remote data processing system, such as, for example, server 104 after the flight has completed.

In other advantageous embodiments, the data processing system on aircraft 116 may identify a set of variances between a set of projected flight plan parameters and a set of actual flight plan parameters. The set of projected flight plan parameters and the set of actual flight plan parameters may include one or more parameters. The set of variances may be zero or more variances. Zero variances may occur if all of the flight plan parameters match up. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

Turning now to FIG. 2, a diagram of a data processing system is depicted in accordance with an advantageous embodiment. Data processing system 200 is an example of a data processing system that may be used to implement servers and clients, such as server 104 and client 110 in FIG. 1. Further, data processing system 200 is an example of a data processing system that may be found in aircraft 116 in FIG. 1.

In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as, program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive or a flash memory that is connected to data processing system 200. The tangible form of computer readable media 218 is also referred to as computer recordable storage media.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

For example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The different advantageous embodiments provide a computer implemented method, apparatus and computer usable program code for managing a flight plan for an aircraft. In the different advantageous embodiments, a set of projected flight plan parameters is associated with a waypoint and is displayed with the waypoint on the display of an aircraft data processing system. User input is received in the form of a set of actual flight plan parameters during the flight of the aircraft.

A set of variances between the set of projected flight plan parameters and the set of actual flight plan parameters are displayed on the map in association with the waypoint. This type of calculation and presentation reduces the amount of work needed by a pilot or other crew of an aircraft. These actual flight plan parameters may be stored in the flight plan or in association with the flight plan. This information may be sent to a remote data processing system for archival or analysis.

Figure 3:
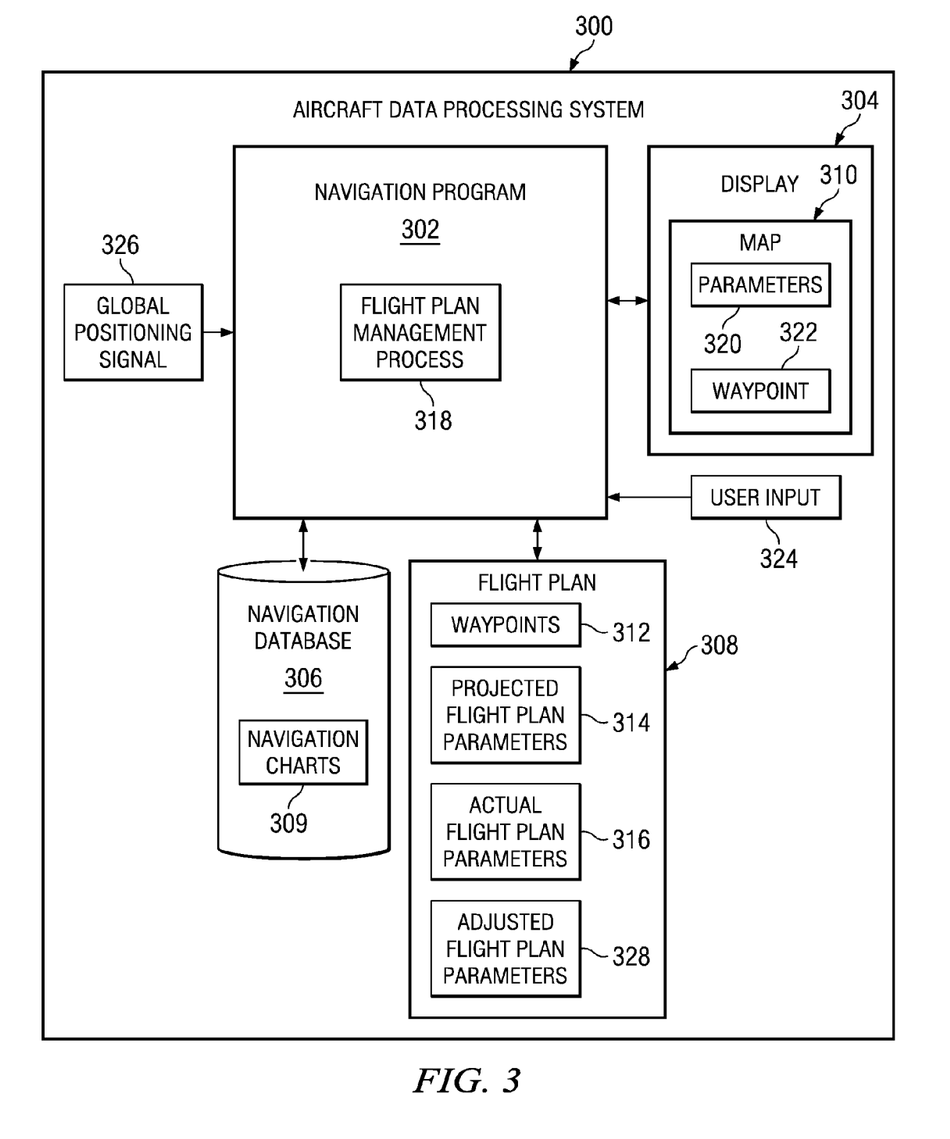
FIG. 3 is a diagram of components used to manage a flight plan in accordance with an advantageous embodiment.

Turning now to FIG. 3, a diagram of components used to manage a flight plan is depicted in accordance with an advantageous embodiment. In this example, aircraft data processing system 300 may be implemented using data processing system 200 in FIG. 2. Aircraft data processing system 300 may take various forms. For example, aircraft data processing system 300 may be a single data processing system or a network of data processing systems containing multiple computers or line replaceable units.

In these advantageous embodiments, aircraft data processing system 300 also may be, for example, an electronic flight bag. An electronic flight bag is an electronic information management device used by flight crews to perform management tasks. An electronic flight bag may, for example, provide navigation charts for air and ground operations. An electronic flight bag also may provide a display of various aviation data, as well as perform basic calculations. These basic calculations include identifying performance data and fuel calculations.

In this example, aircraft data processing system 300 includes navigation program 302, display 304, navigation database 306, and flight plan 308. Navigation program 302 may display information from navigation database 306. This information includes, for example, navigation charts 309. A chart from navigation charts 309 may be displayed as map 310 on display 304.

In these examples, flight plan 308 includes waypoints 312, projected flight plan parameters 314, and actual flight plan parameters 316. Waypoints 312 are geographic locations along the route defined for flight plan 308. In other words, waypoints 312 form the route for flight plan 308. The distance between each waypoint forms a leg at the route in these examples.

Projected flight plan parameters 314 contain the planned information for the route. A set of flight plan parameters within projected flight plan parameters 314 may be associated with each waypoint in waypoints 312. Projected flight plan parameters 314 may include, for example, estimates of speeds and other parameters needed for the desired flight. These sets of flight plan parameters may include, for example, speed, time en route, fuel burned, altitude, and other information.

Further, projected flight plan parameters 314 also may include other information, including, for example, destination airport, departure airport, diverts, and other suitable information for flight plan 308. These flight plan parameters also may be broken down into segments based on reaching different waypoints within waypoints 312.

Actual flight plan parameters 316 contain the actual values for projected flight plan parameters 314. For example, a projected flight plan parameter may be fuel used to reach a particular waypoint. This value may be, for example, 23 gallons. If the amount of fuel actually used is 24.2 gallons, that value forms the value for the actual flight plan parameter.

In these advantageous embodiments, flight plan management process 318 may display information from flight plan 308 on map 310. Map 310 is a navigation chart from navigation charts 309 presented on display 304. Additionally, flight plan management process 318 may display parameters 320 on map 310. In these examples, parameters 320 are displayed in association with waypoint 322 on map 310. Parameters 320 may include parameters from projected flight plan parameters 314. Further, parameters 320 also may include actual flight plan parameters 316 entered by the pilot or other operator. Parameters 320 may show variances between the projected and actual flight plan parameters.

In the advantageous embodiments, an operator may input values for actual flight plan parameters 316 through user input 324. Flight plan management process 318 receives user input 324, which includes a set of values for actual flight plan parameters 316. Flight plan management process 318 stores user input 324 in actual flight plan parameters 316 and also may display those parameters within parameters 320.

During the flight, an operator may view map 310 to see where the aircraft is located with respect to various waypoints that may be displayed on map 310. This type of display may be presented through a moving map function in navigation program 302.

As waypoints are reached, the operator may input actual values for different flight plan parameters as user input 324. These values are recorded in flight plan 308 within actual flight plan parameters 316 as well as being presented within parameters 320.

In addition to displaying variances, flight plan management process 318 also may identify deviations caused by entering user input 324 at a location other than that of waypoint 322. For example, if an operator enters user input 324 when the operator believes the aircraft is at waypoint 322 the difference between the location of waypoint 322 and the aircraft's actual location may be identified by flight plan management process 318. This distance between the actual location of the aircraft and waypoint 322 may be determined through location information such as global positioning signal 326.

Flight plan management process 318 may adjust the projected values based on the actual location. This adjustment does not change flight plan 308. Instead, adjusted flight plan parameters 328 may be stored in flight plan 308 or in association with flight plan 308. In other advantageous embodiments, the actual values may be adjusted to take into account the distance to waypoint 322.

Based on the adjustments, a determination can be made by flight plan management process 318 as to whether any of projected flight plan parameters 314 need to be changed. For example, if user input 324 indicates that the actual fuel usage is correct for waypoint 322, but the actual position of the aircraft is 20 miles before waypoint 322, the fuel burn rate actually may be greater. As a result, this difference may be presented as an alert to the user. With this information, the operator may determine that some flight plan parameters need to be changed. This flight plan parameter may be, for example, the speed at which the aircraft flies.

In other embodiments, the flight plan parameter change may be, for example, the destination, if insufficient fuel is present based on the adjusted calculations. Depending on the situation, the operator may request a change to flight plan 308. The request may be made to an air traffic controller or some other aviation authority.

Additionally, flight plan 308 may be transmitted to a remote data processing system from aircraft data processing system 300. In this manner, flight plan 308 may be archived to provide a history of the flight. This information may be used to complete the projected flight plan parameters in the flight plan to the actual flight plan parameters for a particular aircraft. Further, with this comparison, a determination may be made as to whether various flight plan parameters change over time.

For example, the amount of fuel used by an aircraft may increase over time. If an identification of this trend can be made, then flight plans may be adjusted to take into account the increased needed fuel versus the model for the aircraft. If less fuel is planned for an aircraft, then the aircraft may be able to carry more cargo or passengers.

Further, some authorities may require flight plans to be archived for some period of time. With flight plan management process 318, an electronic flight plan, such as flight plan 308, may be transmitted or transported for archiving after a flight has been completed.

Figure 4:
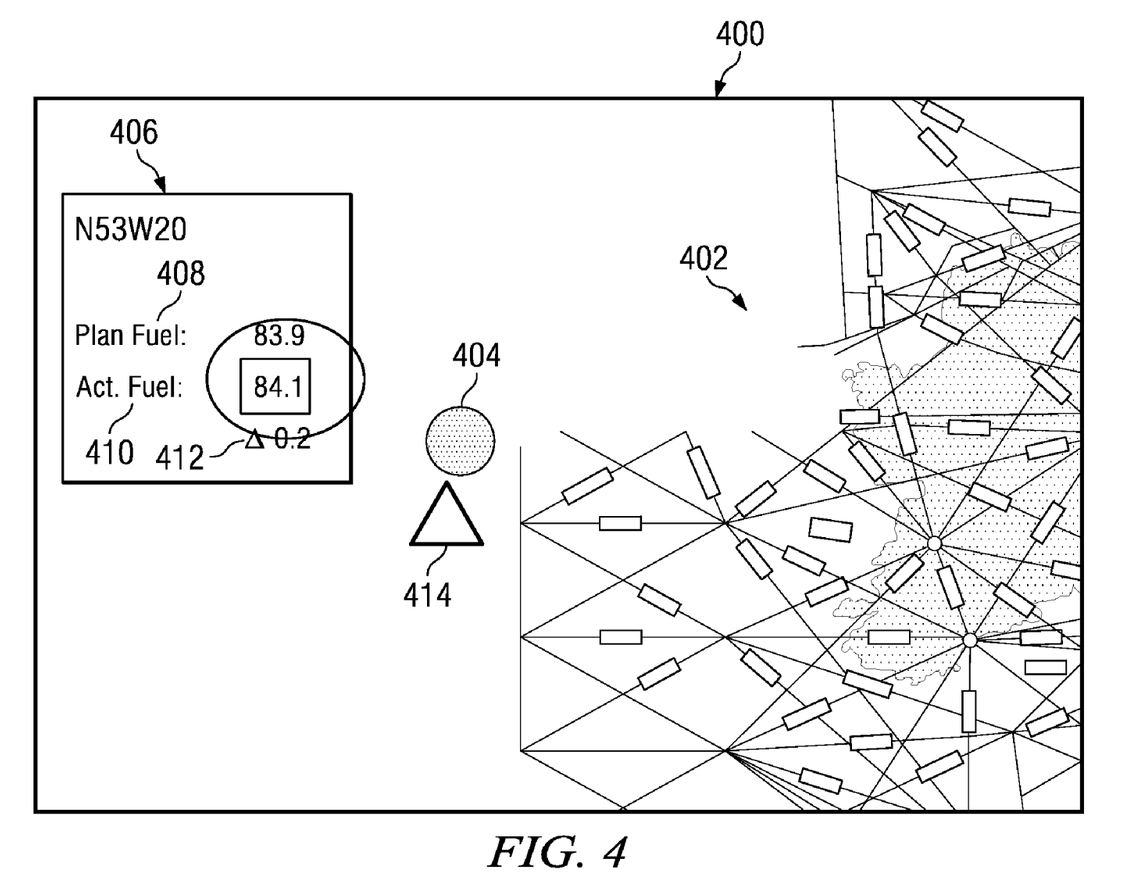
FIG. 4 is a diagram illustrating a display used for managing flight plans in accordance with an advantageous embodiment.

Turning now to FIG. 4, a diagram illustrating a display used for managing flight plans is depicted in accordance with an advantageous embodiment. In this example, screen 400 is an example of a screen that may be presented on display 304 in FIG. 3.

As depicted, map 402 is displayed with waypoint 404. Further, parameters are displayed within section 406 of screen 400. These parameters include projected flight plan parameter 408 and actual flight plan parameter 410 as well as variance 412. In this example, projected flight plan parameter 408 is the projected amount of fuel needed to reach waypoint 404. Actual flight plan parameter 410 displays the actual amount of fuel used to reach waypoint 404. The value for actual flight plan parameter 410 is input when the aircraft reaches waypoint 404. In this example, icon 414 represents the location of the aircraft with respect to waypoint 404. When icon 414 reaches waypoint 404, an operator of the aircraft may input the actual value for fuel used to form actual flight plan parameter 410.

In these examples, actual flight plan parameter 410 may be a value input by a user. In other advantageous embodiments, fuel usage and other flight plan parameters may be automatically obtained from various sensors in the aircraft data processing system. Further, only one flight plan parameter is illustrated in these examples. Of course, in other embodiments, other flight plan parameters may be presented in section 406 in addition to the one for fuel.

Figure 5:
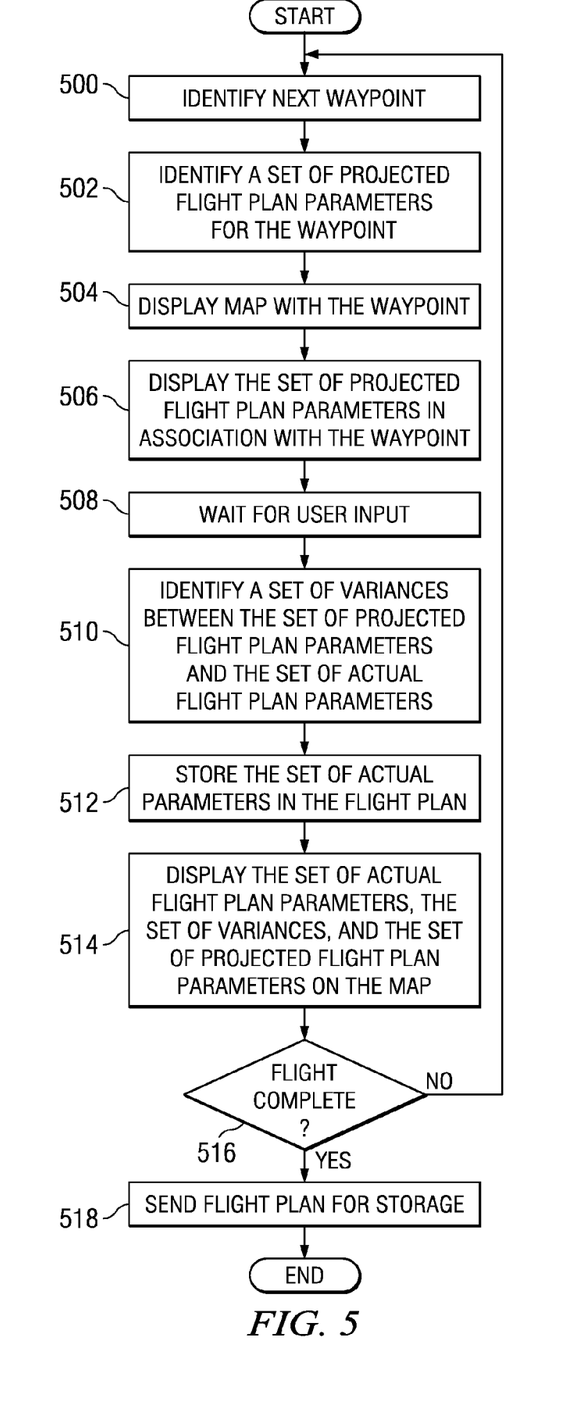
FIG. 5 is a flowchart of a process for managing a flight plan in accordance with an advantageous embodiment.

With reference now to FIG. 5, a flowchart of a process for managing a flight plan is depicted in accordance with an advantageous embodiment. The process illustrated in FIG. 5 may be implemented in a software component, such as flight plan management process 318 in FIG. 3. The process begins by identifying the next waypoint in the flight plan (operation 500). This waypoint is the next waypoint to be reached by the aircraft in following the flight plan. The process identifies a set of projected flight plan parameters for the waypoint (operation 502). This information in operation 502 may be obtained from a flight plan, such as flight plan 308 in FIG. 3.

The process displays a map with the waypoint (operation 504), and displays the set of projected flight plan parameters in association with the waypoint (operation 506). The display in operations 504 and 506 may be similar to map 402 in screen 400 in FIG. 4. The projected flight plan parameters may be associated with the waypoint in a number of different ways. For example, the set of parameters may be displayed in a location on the map such that a user or other operator associates or identifies the set of parameters with the waypoint. In other advantageous embodiments, the set of parameters may be associated with the waypoint by displaying them with an identification of the waypoint.

The process then waits for user input (operation 508). The user input includes values for a set of actual parameters. The user input, in these examples, occurs around the time the aircraft reaches the waypoint. In some advantageous embodiments, the user may be prompted to input the actual flight plan parameters if the navigation system detects that the waypoint has been reached. An audible sound and/or visual indicator may be generated to indicate that it is time to enter data. Upon receiving the user input, the values in the user input are used to identify a set of variances between the set of projected flight plan parameters and the set of actual parameters (operation 510). The set of variances may be a set with zero values if no variances are present between the projected flight plan parameters and the actual flight plan parameters.

The process stores the set of actual parameters in the flight plan (operation 512). In some embodiments, these parameters may be stored separately from the flight plan but in association or linked with the flight plan.

Next, the process displays the set of actual flight plan parameters, the set of variances, and the set of projected flight plan parameters on the map (operation 514). A determination is then made as to whether the flight is complete (operation 516). If the flight is not complete, the process returns to operation 500 to identify the next waypoint in the route.

If the flight is complete in operation 516, the flight plan is sent to storage (operation 518), with the process terminating thereafter. The flight plan may be sent to storage by transmitting the flight plan directly from the aircraft data processing system to a remote data processing system through a communications link. In other advantageous embodiments, the flight plan may be sent for storage by a user transporting the flight plan on a storage device to a remote storage location.

Figure 6:
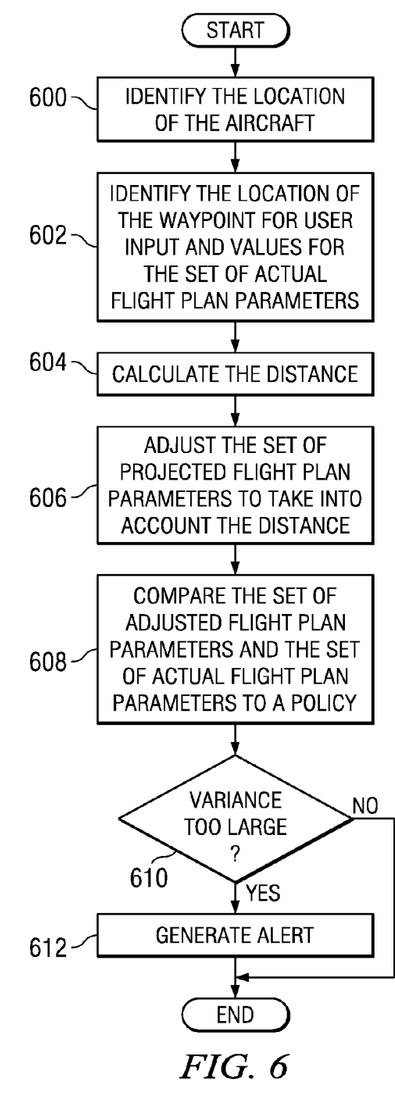
FIG. 6 is a flowchart of a process for managing variances in a flight plan in accordance with an advantageous embodiment.

Turning now to FIG. 6, a flowchart of a process for managing variances in a flight plan is depicted in accordance with an advantageous embodiment. The process illustrated in FIG. 6 may be implemented in a software component, such as flight plan management process 318 in FIG. 3.

The process begins by identifying the location of the aircraft (operation 600). This identification may be made through location information, such as, for example, a global positioning signal. The location of the waypoint for which user input is received for values for the set of actual flight plan parameters is identified (operation 602). The process then calculates the distance between the location of the aircraft and the location of the waypoint (operation 604). The process then adjusts the set of projected flight plan parameters to take into account the distance (operation 606). Operation 606 results in a set of adjusted flight plan parameters similar to adjusted flight plan parameters 328 in FIG. 3.

For example, a projected amount of fuel may be adjusted to take into account the distance. If the values are entered before reaching the waypoint, the amount of fuel burned may be reduced in the projected flight plan parameters. If the values for fuel usage are entered after the waypoint has passed, the projected fuel usage may be increased to take into account what the projected flight plan parameter would have been with a different location. This adjustment estimates the fuel that would have been burned to reach the actual location of the aircraft rather than the waypoint for the route.

Thereafter, the process compares the set of adjusted flight plan parameters and the set of actual flight plan parameters to a policy (operation 608). A determination is made as to whether the variance is too large based on the comparison to the policy (operation 610). If the variance is too large, the process generates an alert (operation 612), with the process terminated thereafter. Otherwise, the process also terminates.

In these examples, the policy is a set of rules used to determine whether the variance between the adjusted set of flight plan parameters and the set of actual flight plan parameters is too large. The variance, in these examples, may be too large if one or more of the flight plan parameters would cause a safety issue or violate a regulation with respect to the flight. For example, if insufficient reserve fuel would be present, the variance would be considered too large.

If an alert is generated in operation 612, the operator may then alter one or more of the flight plan parameters. For example, a different destination may be set such as a divert airport. In other embodiments, the airspeed of the aircraft may be reduced or increased.

Figure 7:
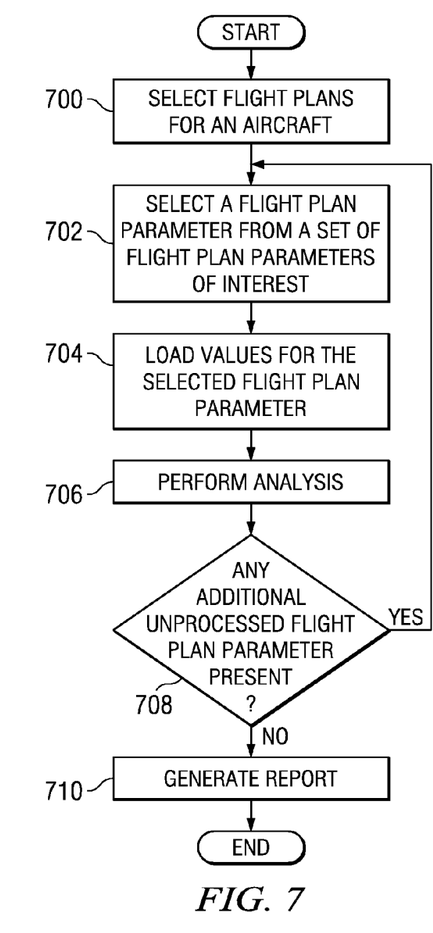
FIG. 7 is a flowchart of a process for analyzing flight plans in accordance with an advantageous embodiment.

With reference now to FIG. 7, a flowchart of a process for analyzing flight plans is depicted in accordance with an advantageous embodiment. The process illustrated in FIG. 7 may be implemented in a data processing system, such as data processing system 200 in FIG. 2. This process may be used to determine whether flight planning processes should be changed for a particular aircraft.

The process begins by selecting flight plans for an aircraft (operation 700). Thereafter, the process selects a flight plan parameter from a set of flight plan parameters of interest (operation 702). The process then loads values for the selected flight plan parameter (operation 704). The process performs an analysis of the data for the selected flight plan parameter (operation 706). The parameters include the projected and actual values for the selected flight plan parameter. This flight plan parameter may be, for example, fuel usage. The analysis performed in operation 706 may be a statistical analysis to identify a trend.

Examples of comparisons that may be made are planned times, wind, and altitude versus actual times, wind, and altitude. The process then determines whether any additional unprocessed flight plan parameters are present in the set of flight plan parameters (operation 708). If additional unprocessed parameters are present, the process returns to operation 702. Otherwise, the process generates a report (operation 710) with the process terminating thereafter. This report may be used to determine whether changes are needed to a flight plan process for a particular aircraft.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Thus, the different advantageous embodiments provide a computer implemented method, apparatus, and computer usable program code for managing a flight plan for an aircraft. The set of projected flight plan parameters associated with the waypoint are presented on the display of an aircraft data processing system. In response to receiving user input in the form of actual flight plan parameters, a set of variances between the set of projected flight plan parameters and the set of actual flight plan parameters may be displayed on the map in association with the way point.

Further, the different advantageous embodiments also may determine whether the variances are great enough to require a change in the flight plan. This change may include changes in various parameters in the flight plan, such as, for example, speed, altitude, and/or destination. Of course, some flight plan changes may require approval by a regulatory authority such as a flight traffic controller. Also, in identifying variances between the projected set of flight plan parameters and the actual flight plan parameters, the different advantageous embodiments may take into account the actual location of the aircraft with respect to the location of the waypoint. In this manner, situations in which the actual flight plan parameters appear to be acceptable when they are further off because of the distance from the waypoint may be avoided.

The flight plans generated may be saved to form a history of flight plans. This history may be used to determine whether changes in projected flight plan parameters should occur. In some cases, as an aircraft ages, the amount of fuel used changes. Often times, the amount of fuel used increases. As a result, the flight planning process may be altered if it can be demonstrated that this type of fuel usage has changed. Further, the flight planning process or program also may incorrectly estimate parameters such as fuel usage or other parameters in a flight plan. This type of history may be used to determine whether changes are needed to the flight planning process.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer-readable medium can generally be any tangible apparatus that can contain, store, communicate, propagate, or transport the program for use by or in connection with the instruction execution system, apparatus, or device.

The computer-usable or computer-readable medium can be, for example, without limitation an electronic, magnetic, optical, electromagnetic, infrared, or semiconductor system, or a propagation medium. Non-limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read-only memory (CD-ROM), compact disk-read/write (CD-R/W) and DVD.

Further, a computer-usable or computer-readable medium may contain or store a computer-readable or usable program code such that when the computer-readable or usable program code is executed on a computer, the execution of this computer-readable or usable program code causes the computer to transmit another computer-readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer implemented method for managing a flight plan for an aircraft, the computer implemented method comprising:
   displaying a set of projected flight plan parameters associated with a waypoint presented on a display of an aircraft data processing system;
   receiving user input to form a set of actual flight plan parameters; and
   displaying a set of variances between the set of projected flight plan parameters and the set of actual flight plan parameters on a map in association with the waypoint.

2. The computer implemented method of claim 1 further comprising:
   displaying the set of actual flight plan parameters on the display.

3. The computer implemented method of claim 1 further comprising:
   determining an actual location of the aircraft when the user input is received;
   calculating a distance between the actual location of the aircraft and a location of the waypoint; and
   identifying the set of variances caused by the distance.

4. The computer implemented method of claim 3 further comprising:
   determining whether a change in the flight plan is needed based on the set of variances.

5. The computer implemented method of claim 4, wherein the change is selected from one of a change in speed, a change in arrival time, a change in a leg in the flight plan, and a change in a destination.

6. The computer implemented method of claim 1, further comprising:
   storing all sets of actual flight plan parameters in the flight plan on a computer readable medium.

7. The computer implemented method of claim 6 further comprising:
   sending the flight plan with all stored sets of actual flight plan parameters to a remote data processing system after completion of a flight using the flight plan.

8. A data processing system comprising:
   a bus;
   a communications unit connected to the bus;
   a storage device connected to the bus, wherein the storage device includes computer usable program code; and
   a processor unit connected to the bus, wherein the processor unit executes the computer usable program code to display a set of projected flight plan parameters associated with a waypoint presented on a display of an aircraft data processing system; receive user input to form a set of actual flight plan parameters; and display a set of variances between the set of projected flight plan parameters and the set of actual flight plan parameters on a map in association with the waypoint.

9. The data processing system of claim 8, wherein the processor unit further executes the program code to display the set of actual flight plan parameters on the display.

10. The data processing system of claim 8, wherein the processor unit further executes the program code to determine an actual location of an aircraft when the user input is received; calculate a distance between the actual location of the aircraft and a location of the waypoint; and identify the set of variances caused by the distance.

11. The data processing system of claim 10, wherein the processor unit further executes the program code to determine whether a change in a flight plan is needed based on the set of variances.

12. The data processing system of claim 11, wherein the change is selected from one of a change in speed, a change in arrival time, a change in a leg in the flight plan, and a change in a destination.

13. The data processing system of claim 8, wherein the processor unit further executes the program code to store all sets of actual flight plan parameters in the flight plan on a computer readable medium.

14. The data processing system of claim 13, wherein the processor unit executes the program code to send the flight plan with all stored sets of actual flight plan parameters to a remote data processing system after completion of a flight using the flight plan.

15. A computer program product for managing a flight plan for an aircraft, the computer program product comprising:
   a computer readable medium;
   program code, stored on the computer readable medium, for displaying a set of projected flight plan parameters associated with a waypoint presented on a display of an aircraft data processing system;

program code, stored on the computer readable medium, for receiving user input to form a set of actual flight plan parameters; and program code, stored on the computer readable medium, for displaying a set of variances between the set of projected flight plan parameters and the set of actual flight plan parameters on a map in association with the waypoint.

16. The computer program product of claim 15 further comprising:

program code, stored on the computer readable medium, for displaying the set of actual flight plan parameters on the display.

17. The computer program product of claim 16, further comprising:

program code, stored on the computer readable medium, for storing all sets of actual flight plan parameters in the flight plan on a computer readable medium.

18. The computer program product of claim 15 further comprising:

program code, stored on the computer readable medium, for determining an actual location of the aircraft when the user input is received;

program code, stored on the computer readable medium, for calculating a distance between the actual location of the aircraft and a location of the waypoint; and program code, stored on the computer readable medium, for identifying the set of variances caused by the distance.

19. The computer program product of claim 18 further comprising:

program code, stored on the computer readable medium, for determining whether a change in the flight plan is needed based on the set of variances.

20. The computer program product of claim 19, wherein the change is selected from one of a change in speed, a change in arrival time, a change in a leg in the flight plan, and a change in a destination.

* * * * *